US011829410B2

(12) United States Patent
Liu et al.

(10) Patent No.: US 11,829,410 B2
(45) Date of Patent: Nov. 28, 2023

(54) PLAYING USER PREFERRED MUSIC IN A SELECTED AREA

(71) Applicant: International Business Machines Corporation, Armonk, NY (US)

(72) Inventors: Su Liu, Austin, TX (US); Manjunath Ravi, Austin, TX (US); Kai Liu, Malden, MA (US); Zhichao Li, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 326 days.

(21) Appl. No.: 16/460,861

(22) Filed: Jul. 2, 2019

(65) Prior Publication Data

US 2021/0004403 A1 Jan. 7, 2021

(51) Int. Cl.
 *G06F 16/63* (2019.01)
 *G06F 16/635* (2019.01)
 *G06F 16/687* (2019.01)
 *G06F 16/638* (2019.01)
 *H04W 4/021* (2018.01)

(52) U.S. Cl.
 CPC .......... *G06F 16/637* (2019.01); *G06F 16/639* (2019.01); *G06F 16/687* (2019.01); *H04W 4/021* (2013.01)

(58) Field of Classification Search
 CPC .... G06F 16/637; G06F 16/687; G06F 16/639; H04W 4/021; H04W 4/02; H04W 4/33
 See application file for complete search history.

(56) References Cited

U.S. PATENT DOCUMENTS

| | | |
|---|---|---|
| 6,721,652 B1 | 4/2004 | Sanqunetti |
| 6,993,532 B1 | 1/2006 | Platt et al. |
| 8,489,119 B1 | 7/2013 | Fraccaroli |
| 9,436,929 B2 | 9/2016 | Oliver et al. |
| 9,495,447 B1 | 11/2016 | Phillips et al. |
| 9,659,068 B1 * | 5/2017 | Mattsson .............. G06F 16/637 |
| 2006/0143236 A1 | 6/2006 | Wu |

(Continued)

OTHER PUBLICATIONS

Spotify, Spotify for Brands, https://www.spotifyforbrands.com/en-GB/, known about as early as Apr. 12, 2019, downloaded on Jun. 18, 2019, pp. 1-12.

*Primary Examiner* — Pierre M Vital
*Assistant Examiner* — Andrew N Ho
(74) *Attorney, Agent, or Firm* — Kunzler Bean & Adamson

(57) ABSTRACT

A method for playing music includes identifying a plurality of users of a corresponding plurality of electronic devices that are currently located within a selected area, retrieving music listening data for the plurality of users, building a playlist for the selected area based on the music listening data, filtering the playlist according to at least one host preference to produce a filtered playlist, and playing the filtered playlist within the selected area. The selected area may be a geo-fenced area. Examples of host preferences include genre, artist, tempo, mood and demographic. The playlist may include songs that are commonly selected by the plurality of users or conform to genres commonly preferred by the plurality of users. A corresponding system and computer program product for executing the above method are also disclosed herein.

20 Claims, 8 Drawing Sheets

(56) References Cited

U.S. PATENT DOCUMENTS

| | | | |
|---|---|---|---|
| 2006/0224798 A1* | 10/2006 | Klein | G06F 16/683 |
| | | | 710/62 |
| 2007/0299681 A1* | 12/2007 | Plastina | H04L 65/612 |
| | | | 705/902 |
| 2008/0091717 A1 | 4/2008 | Garbow et al. | |
| 2008/0133593 A1 | 6/2008 | Clark | |
| 2008/0275904 A1* | 11/2008 | Breebaart | G06F 16/634 |
| 2009/0094257 A1* | 4/2009 | Nissen | G06F 16/444 |
| 2011/0054646 A1 | 3/2011 | Hernandez et al. | |
| 2012/0072418 A1* | 3/2012 | Svendsen | G06F 3/048 |
| | | | 707/724 |
| 2013/0018897 A1* | 1/2013 | Martinez | H04L 67/52 |
| | | | 707/754 |
| 2014/0031961 A1* | 1/2014 | Wansley | H04W 4/021 |
| | | | 700/94 |
| 2014/0115462 A1 | 4/2014 | Reznor et al. | |
| 2015/0237472 A1* | 8/2015 | Alsina | H04W 4/021 |
| | | | 455/456.3 |
| 2015/0277849 A1* | 10/2015 | Beaumier | H05K 5/0213 |
| | | | 715/716 |
| 2015/0277852 A1* | 10/2015 | Burgis | G06F 16/637 |
| | | | 700/94 |
| 2017/0249306 A1* | 8/2017 | Allen | G06F 16/438 |
| 2017/0338974 A1 | 11/2017 | Shoemaker et al. | |
| 2018/0189391 A1* | 7/2018 | Ip | G06F 16/635 |
| 2020/0042554 A1* | 2/2020 | Liu | G06F 16/687 |
| 2020/0097666 A1* | 3/2020 | Weldemariam | G06F 21/6218 |

* cited by examiner

PLAYING USER PREFERRED MUSIC IN A SELECTED AREA

BACKGROUND

The subject matter disclosed herein relates generally to playing user preferred music and specifically to selecting and playing user preferred music in a selected area.

Establishments and event hosts often play music in a room or area in order to create an environment conducive to the objectives of the establishment or event. However, the selected music may not match the musical preferences of the individuals that are present in the room or area. In many instances, the establishment or event host may not be aware of the musical preferences of the individuals that are present.

SUMMARY OF THE INVENTION

A method for playing music includes identifying a plurality of users of a corresponding plurality of electronic devices that are currently located within a selected area, retrieving music listening data for the plurality of users, building a playlist for the selected area based on the music listening data, filtering the playlist according to at least one host preference to produce a filtered playlist, and playing the filtered playlist within the selected area. The selected area may be a geo-fenced area. Examples of host preferences include genre, artist, tempo, mood and demographic. The playlist may include songs that are commonly selected by the plurality of users or conform to genres commonly preferred by the plurality of users. A corresponding system and computer program product for executing the above method are also disclosed herein.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

The embodiments disclosed herein recognize that music selected by a host or played by a music channel may not match the musical preferences of the individuals that are present in a room or area. In response thereto, the present invention enables dynamic selection and playback of songs based on the individuals present in a room or area as well as the preferences of the host.

DETAILED DESCRIPTION OF THE INVENTION

One of skill in the art will appreciate that references throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Figure 1:
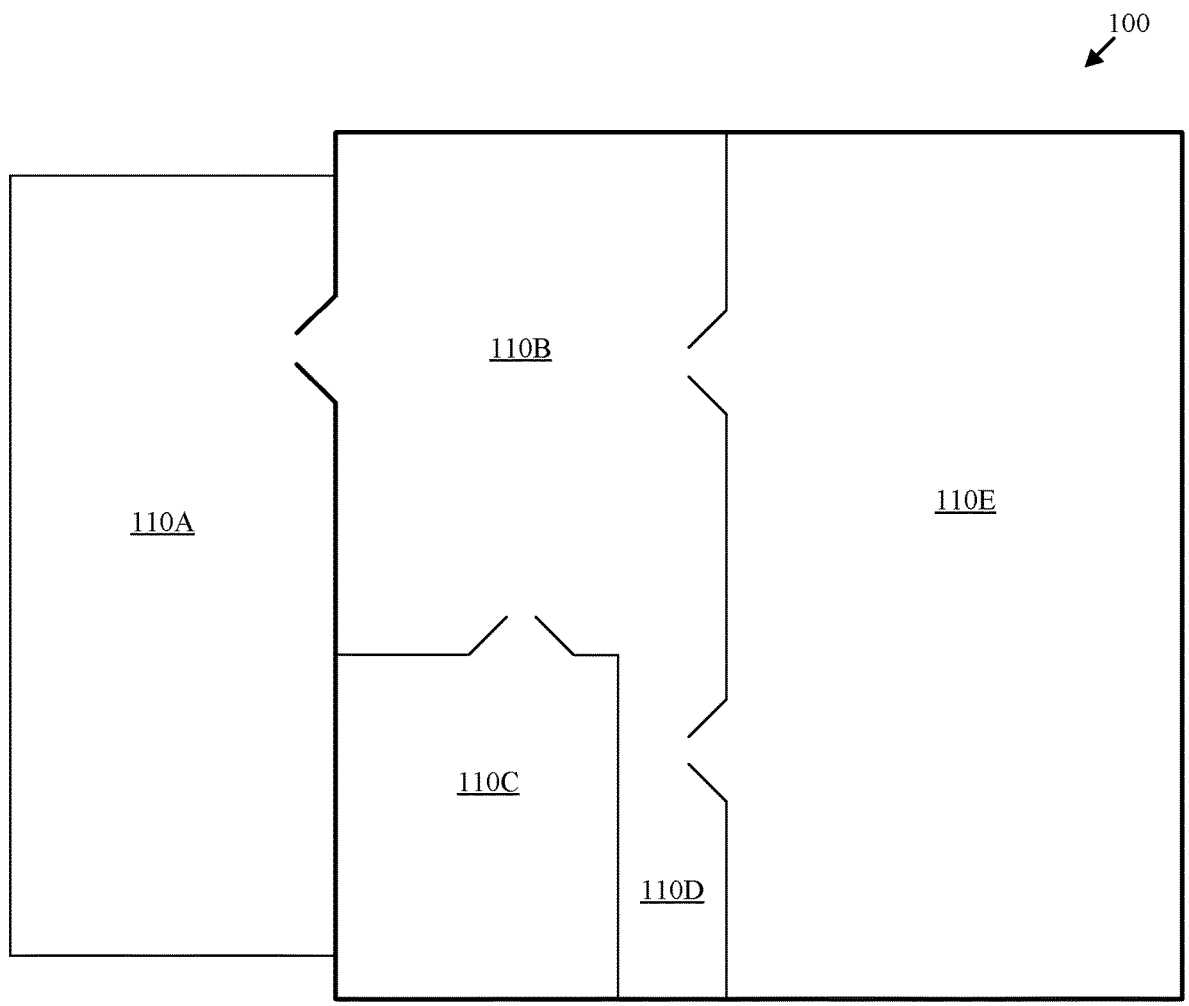
FIG. 1 is a plan view diagram of one example of an environment where the present invention may be deployed in accordance with at least one embodiment disclosed herein.

FIG. 1 is a plan view diagram of one example of an environment 100 where the present invention may be deployed in accordance with at least one embodiment disclosed herein. As depicted, the environment 100 includes various areas 110 including a patio area 110A, a foyer area 110B, a small gathering room 110C, a hallway 110D and a large gathering room 110E. The various depicted areas are non-definitive examples of areas wherein the present invention may be deployed.

At least some areas may have an intended purpose. The intended purpose may be dependent on the events, meetings or activities that are held therein and/or the type of establishment associated with the environment 100. For example, the establishment associated with the environment 100 may be, without limitation, a retail establishment, a business establishment, an entertainment establishment, an eating establishment, a club, and a residence.

The demographic profile of the guests that are present in the environment 100 and areas 110, may change according to various factors such as the intended purpose, time of day, day of the week, and external factors such as weather. Furthermore, the actual individuals that are present in the areas 110 may have musical tastes that vary from the norm of the typical demographic associated with the environment 100 even when the aforementioned factors are accounted for.

The embodiments disclosed herein recognize the dynamic nature of the music listening tastes of individuals present in various environments such as the environment 100. The embodiments disclosed herein also recognize the dynamic nature of the objectives of the establishment or host associated with the events and activities conducted within various environments and areas within those environments.

Figure 2:
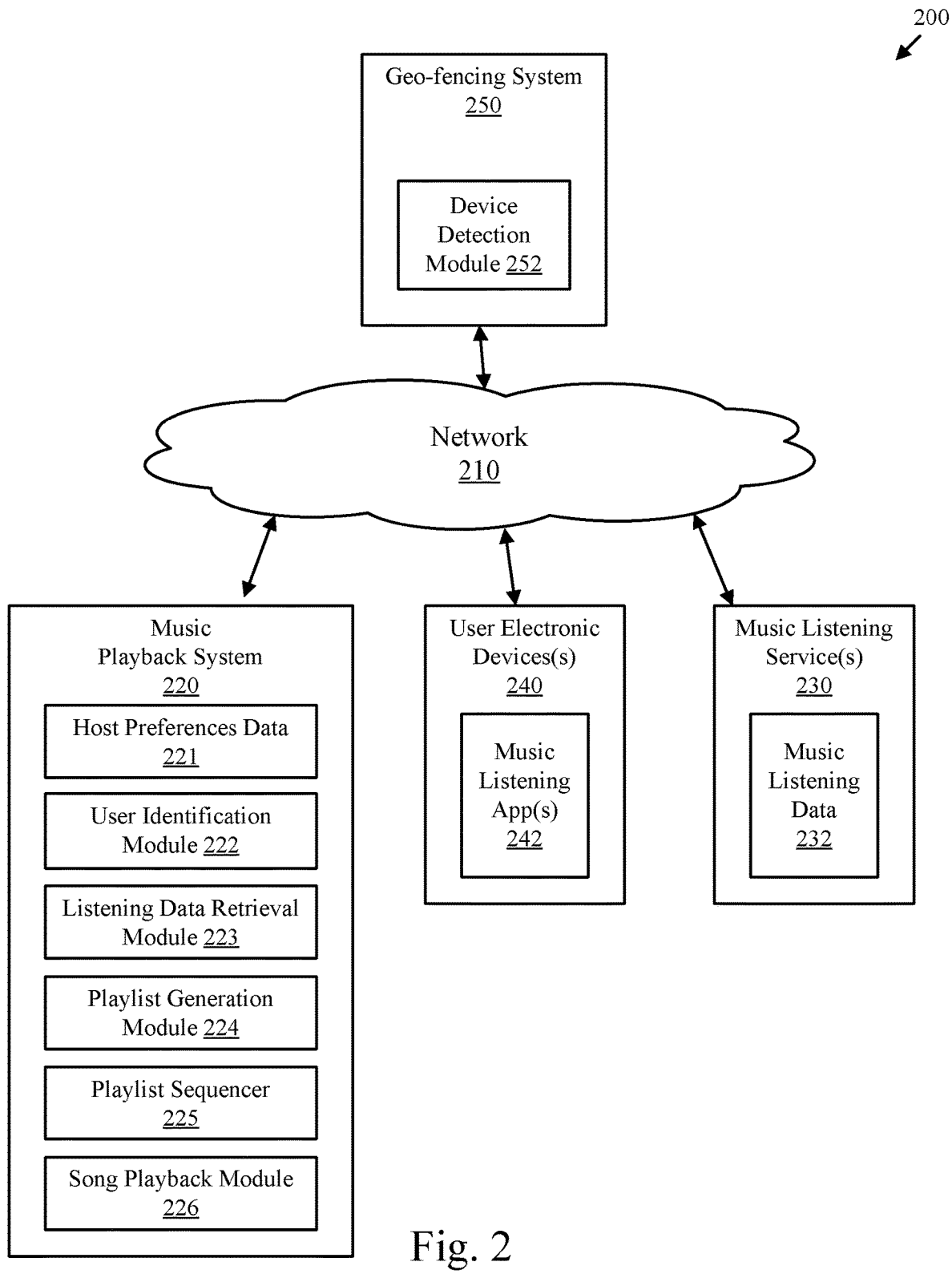
FIG. 2 is a block diagram of one example of a music listening system in accordance with at least one embodiment disclosed herein.

FIG. 2 is a block diagram of one example of a music listening system 200 in accordance with at least one embodiment disclosed herein. As depicted, the music listening system 200 includes a network 210, a music playback system 220, one or more music listening service(s) 230, one or more user electronic device(s) 240 and optionally a geo-fencing system 250. The music listening system 200 provides music to an area or environment according to the listening preferences of users (not shown) of the user electronic devices 240.

The network 210 enables communication between the various elements of the music listening system 200. The network 210 may include any combination of wired and wireless components such as routers and switches that enable communication between devices connected to the network 210 such as the music playback system 220 and the user electronic device(s) 240.

The depicted music playback system 220 includes host data 221, a user identification module 222, a listening data retrieval module 223, a playlist generation module 224, a playlist sequencer 225 and a song playback module 226. The various elements of the music playback system 220 function cooperatively to provide music to environments such as the environment 100.

The host data 221 indicates host preferences and objectives for the music listening experience. Examples include playback hours and preferred genres, tempo, mood and demographic. The preferences and objectives may be area and schedule dependent. In some embodiments, defaults are set for the environment as a whole and/or one or more areas and a scheduling table indicates when the defaults could be, or should be, overridden.

The user identification module 222 identifies users of the electronic devices present in areas 110. The listening data retrieval module 223 retrieves listening data for the identified users from the music listening services 230. For example, the retrieval module 223 may retrieve music listening histories and/or preferred music genres from the music listening service(s) 230.

The playlist generation module 224 may generate a playlist of one or more songs based on the music listening data 232 and the host data 221. The playlist may include commonly selected songs for the identified users and/or one or more songs that conform to a commonly preferred genre for the identified users. The playlist may be appended to a listening queue (not shown) which is managed by the playlist sequencer. In some embodiments, the listening queue is a queue of playlists and each playlist is a list of song identifier. The listening queue may also be a queue of song identifiers extracted from one or more playlists.

In one particular embodiment, the playlist generation module 224 generates a single selection playlist in response to a song request from the playlist sequencer. Generating a single selection playlist only when needed enables the music listening system 200 to readily adapt to changes such as changes to the users present in an area or environment. The playlist sequencer 225 may sequence through the listening queue and provide a song to the song playback module 226 when playback of the current song is finished or pre-empted.

The music listening service(s) 230 may maintain music listening data 232 and provide songs to the music listening app(s) 242. Examples of music listening data 232 include music listening histories and preferred genres and moods. The music listening data 232 may also include disliked genres and moods.

The user electronic device(s) 240 may have one or more music listening app(s) 242. Each music listening app 242 may correspond to a music listening service 230. The music listening app(s) 242 may (locally or remotely) store user profile information as well as the music listening data 232.

Figure 3A:
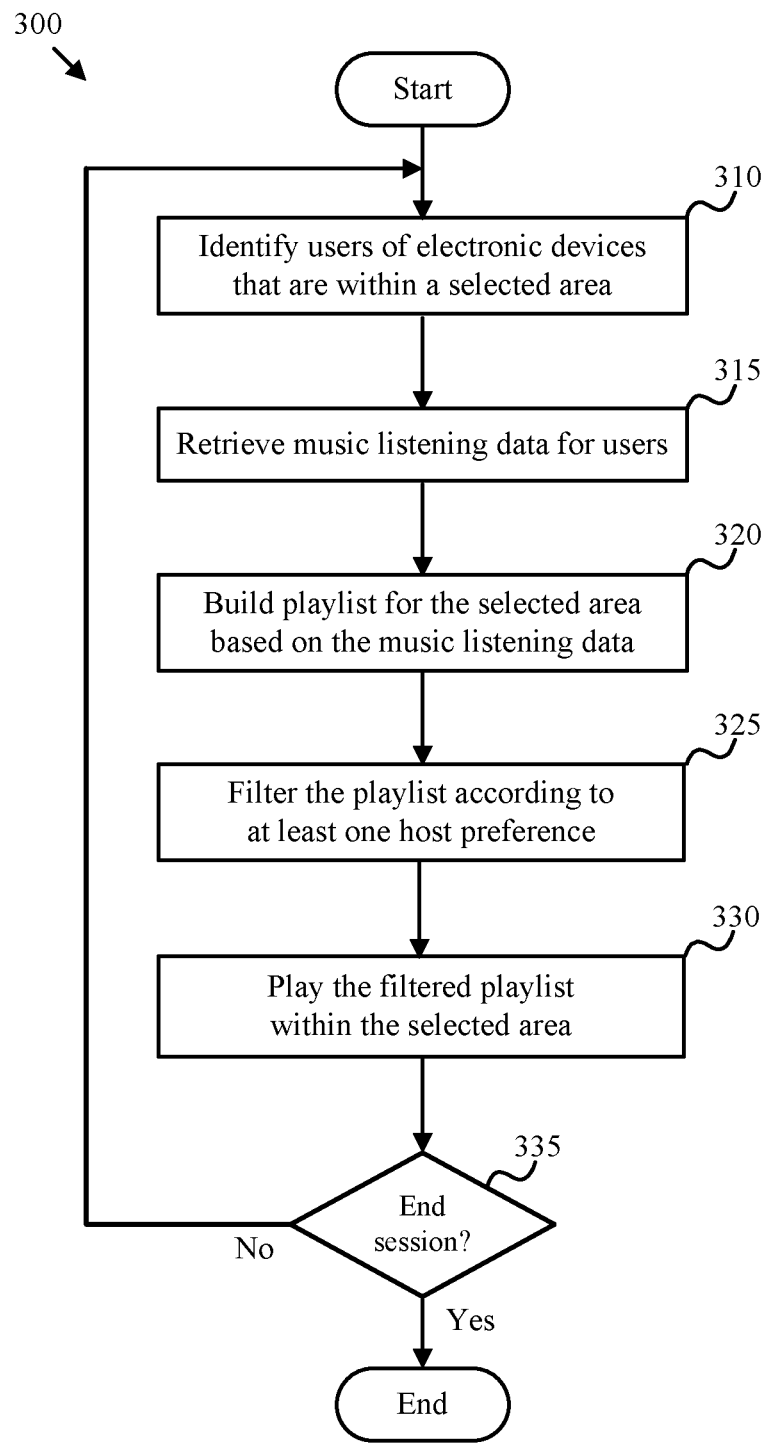
FIG. 3A is a flowchart of one example of a music listening method in accordance with at least one embodiment disclosed herein.

FIG. 3A is a flowchart of one example of a music listening method 300 in accordance with at least one embodiment disclosed herein. As depicted, the music listening method 300 includes identifying (310) users of electronic devices, retrieving (315) music listening data for users, building (320) a playlist for the selected area, filtering (325) the playlist, playing (330) the filtered playlist and determining (335) whether the session has ended. The music listening method 300 enables dynamic selection and playback of music preferred by users who are currently within an area or environment. The music listening method 300 may be conducted by the music playback system 220 or the like.

Identifying (310) users of electronic devices may include identifying electronic devices that are currently within a selected area or environment and determining the users of those electronic devices. The selected area or environment may be a geo-fenced area or environment. However, the present invention is not limited to geo-fenced areas or environments.

In some embodiments, an application such as a music listening app 242 detects a music playback system 220 (or the like) and provides user identity and location information to facilitate the playback of user preferred music in the area or environment where the user is currently located.

Retrieving (315) music listening data 232 for users may include retrieving the music listening data 232 from the music listening services 230 and/or the user electronic devices 240. Music listening data 232 may be retrieved for users whose electronic devices 240 are present in an area or environment.

Building (320) a playlist for the selected area may include using the music listening data to build a playlist of user preferred music. Filtering (325) the playlist may include referencing the host preferences data 221 to determine if the selections in the playlist conform to the preferences of the host. In some embodiments, the filtering operation 325 is performed previous to inclusion of a song into the playlist (e.g., concurrent with the playlist building operation 320).

Playing (330) the filtered playlist may include sequentially playing the selections in the filtered playlist over a sound system for the area or environment. Determining (335) whether the session has ended may include determining whether all songs within the playlist(s) within a listening queue have finished playing. In some embodiments, the determining operation 335 also detects whether playback hours have ended or whether playback has been pre-empted by the host. If the session has not ended, the method loops to the identifying operation 310. If the session has ended, the method terminates.

Figure 3B:
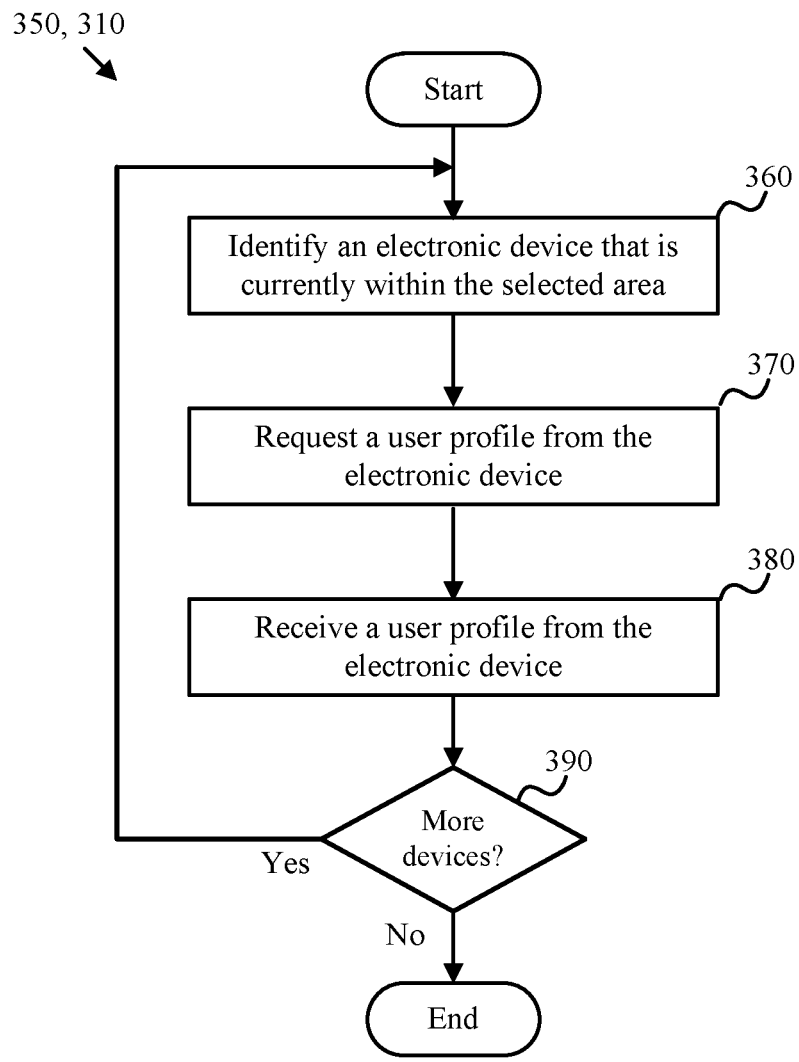
FIG. 3B is a flowchart of one example of a user information retrieval method in accordance with at least one embodiment disclosed herein.

FIG. 3B is a flowchart of one example of a user information retrieval method 350 in accordance with at least one embodiment disclosed herein. As depicted, the user information retrieval method 350 includes identifying (360) an electronic device, requesting (370) a user profile, receiving (380) the user profile, and determining (390) whether more devices are present. The user information retrieval method 350 is one example of the identifying operation 310 of the music listening method 300. The user information retrieval method 350 may be conducted by the music playback system 220 or the like.

Identifying (360) an electronic device may include determining that an electronic device, such as a user electronic device 240, is within an area or environment and determining a unique identifier for the electronic device. In one embodiment, the electronic device shares its location and user identity with the music playback system 220 via a music listening app executing thereon. In another embodiment, the device detection module 252 of the geo-fencing system 250 detects the electronic device. For example, the device detection module 252 may detect wireless communication or signals associated with the network 210 and determine a MAC address or some other unique identifier for the user electronic device 240. The device detection module 252 may also detect the location of the user electronic device 240 via means and methods known to those of skill in the arts of geo-fencing and beacon detection.

Requesting (370) a user profile may include sending the unique identifier for the electronic device to user profile database server. The user profile database server may be maintained by a music listening service, a wireless service provider, or the like.

Receiving (380) the user profile may include receiving information about the user of the electronic device from the user profile database server. The received information may include user identity information, demographic information, music preferences and the like.

Determining (390) whether more devices are present may include determining if another electronic device has shared its location information or the device detection module 252 has detected another electronic device. If more devices are present the method loops to the identifying operation 360. If no more devices are present, the method terminates.

Figure 4A:
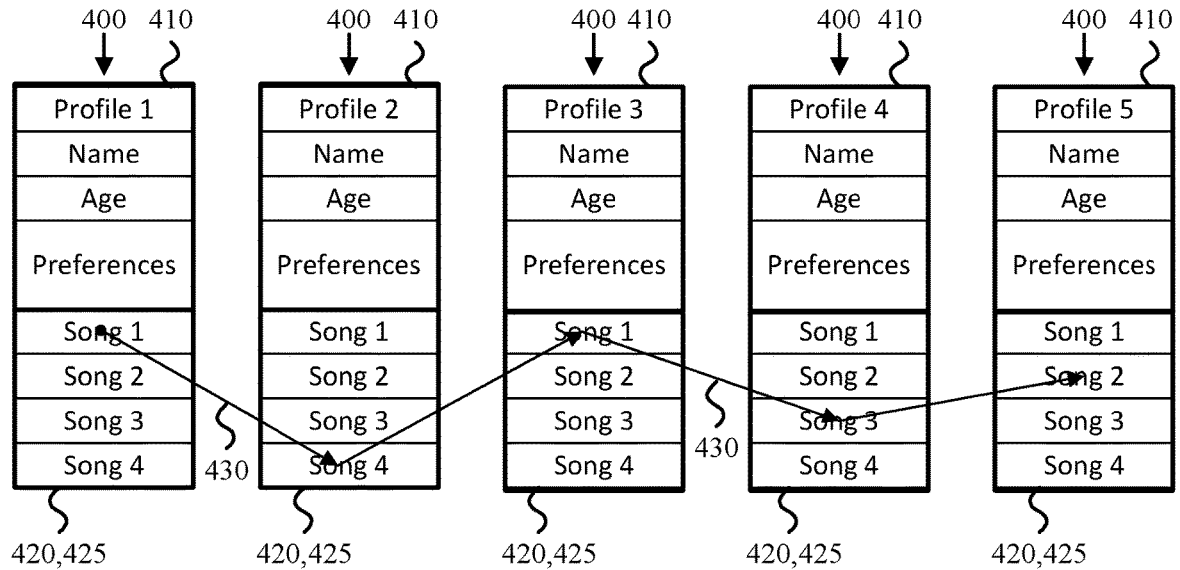
FIGS. 4A-4C are block diagrams of various examples of music listening data structures in accordance with at least one embodiment disclosed herein.
Figure 4B:
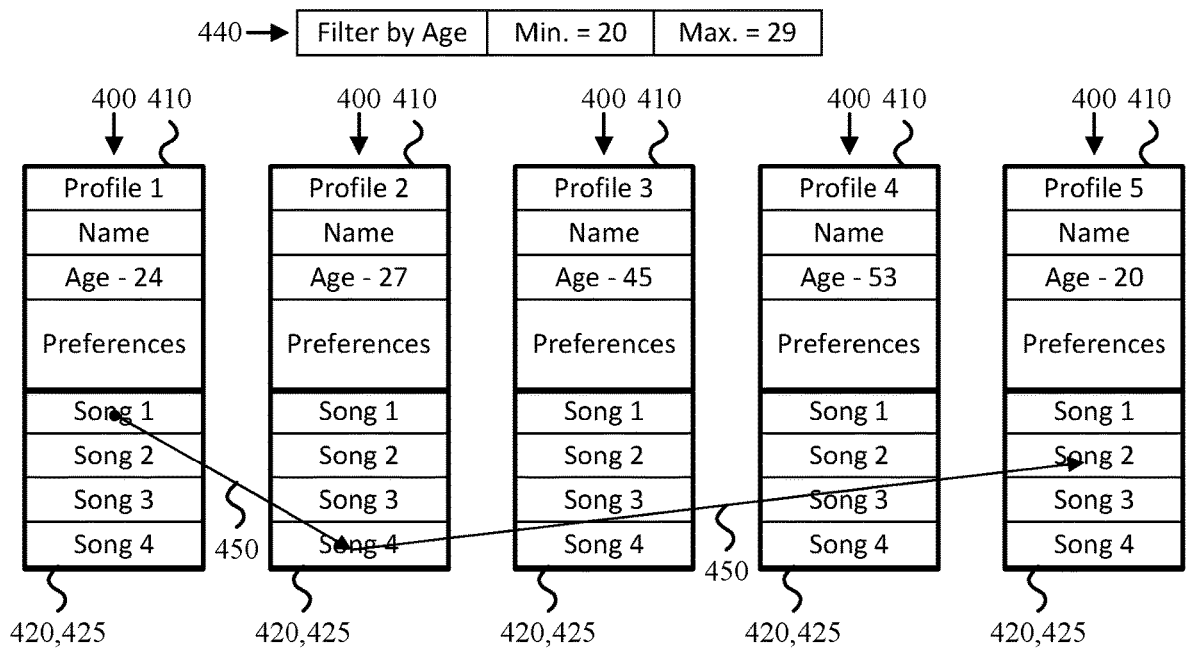
Figure 4C:
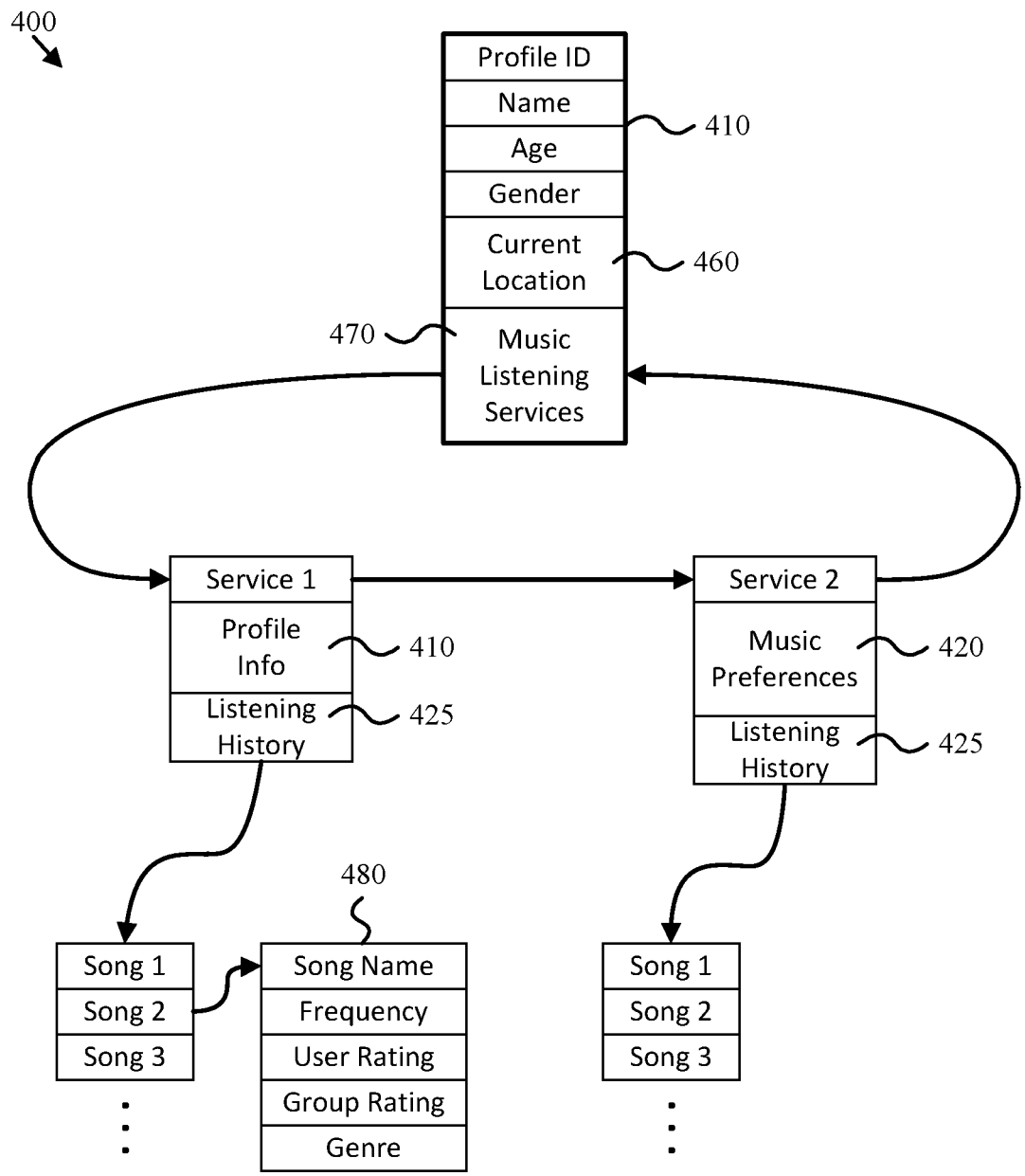

FIGS. 4A-4C are block diagrams of various examples of music listening data structures in accordance with at least one embodiment disclosed herein. The music listening data structures depicted in FIGS. 4A and 4B include user-specific data 400 comprising profile data 410 and music listening data 420. The depicted user-specific data 400 may be data for users that are present in a selected area.

In the embodiments depicted in FIGS. 4A and 4B, the music listening data 420 comprises a song listening history for each user. A playlist 430 may be constructed (e.g., at step 320 of the music listening method 300) that comprises a selection of songs from the song listening histories. For purposes of portrayal, the depicted playlist 430 comprises a single song selected from each users' song listening history. However, the present invention is not limited to selecting a single song from each users' song listening history. For example, the song listening histories and the profile preferences may be processed to find the songs and/or genres that are most popular or highest rated. The popularity, ratings and preferences of the users of electronic devices 240 that are present in the selected area may be used in constructing the playlist 430.

As shown in FIG. 4B, a filter 440 may be used (e.g., at step 325 of the music listening method 300) to filter the playlist 430 and provide a filtered playlist 450. In the depicted embodiment, the filter 440 specifies a desired demographic (i.e., ages 20-29) for the selected music. Although a single filter 440 is shown, the present invention does not require filtering and is not limited to a single filter 440. For example, multiple filters 440 may be constructed from the host preferences data 221 and used to filter the playlist 430 and provide the filtered playlist 450.

FIG. 4C depicts a more detailed version of the user-specific data 400. In addition to the profile data 410 for a specific user, the user-specific data 400 may include location data 460 and a music listening services list 470. Some of the music listening services referenced in the music listening services list 470 may also have profile data 410 that may provide additional information about the user. In the depicted embodiment, each of the referenced music listening services maintains a music listening history 425 similar to the examples shown in FIGS. 4A and 4B.

As shown in FIG. 4C, some of the music listening services may maintain song information 480. The depicted song information 480 includes a song name, frequency (e.g., listens per month), a user rating, a group rating and a genre. One of skill in the art will appreciate that the song information 480 can be leveraged by the music listening method 300 to select songs preferred by users present in an environment 100 or area 110.

One of skill in the art will appreciate the ability of the disclosed embodiments to dynamically adapt to the musical tastes of users of electronic devices 240 that are currently present in various environments 100 and specific areas with those environments.

Figure 5A:
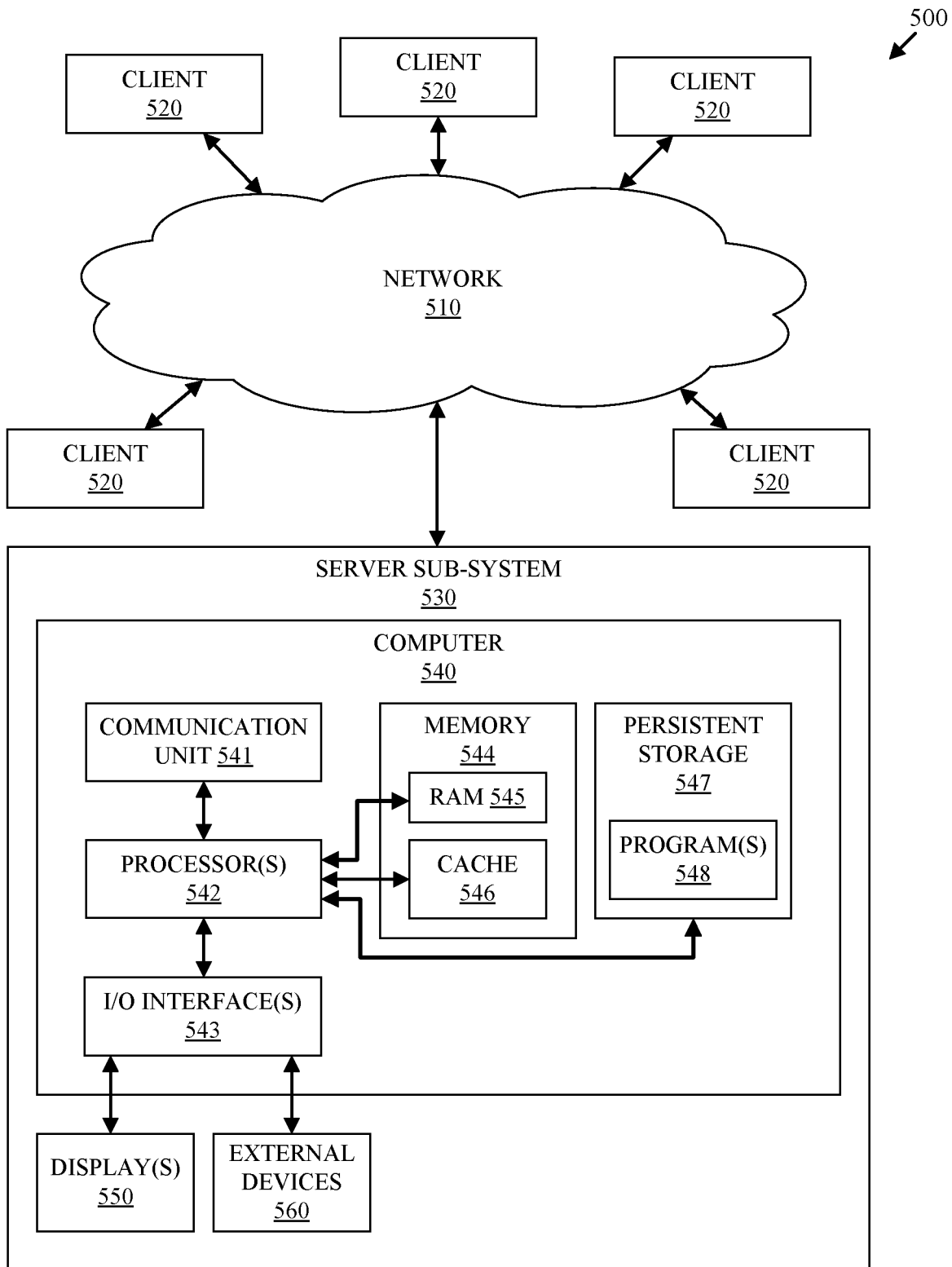
FIG. 5A is a block diagram illustrating various portions of a computing environment in accordance with at least one embodiment disclosed herein.

FIG. 5A is a block diagram illustrating various portions of a computing system 500 in accordance with at least one embodiment disclosed herein. As depicted, computing system 500 includes a communication network 510, one or more client devices 520, and at least one server subsystem 530. The depicted server subsystem 530 includes at least one computer 540 connected to one or more displays 550 and one or more external devices 550. The depicted computer 540 includes a communication unit 541, one or more processors 542, a set of I/O interfaces 543, memory 544, including random access (i.e., main) memory 545 and cache memory 546, and persistent storage 547 that stores one or more programs or executables 548.

Similar to the depicted subsystem 530, the clients 520 may comprise a computer 540. Subsystem 530 and computer 540 are, in many respects, representative of the subsystems and devices that can execute at least a portion of one or more methods disclosed herein. Accordingly, several portions of subsystem 530 and computer 540 will now be discussed in the following paragraphs.

Computer 540 may be a laptop computer, tablet computer, netbook computer, personal computer (PC), desktop computer, personal digital assistant (PDA), smart phone, or any programmable electronic device capable of communicating via network 510. Each executable 548 is a collection of machine readable instructions and/or data that is used to perform at least some of the software functions discussed herein. For example, the methods describe herein may correspond to one or more executables 548.

Computer 540 is capable of communicating with other computing devices, such as the clients 520 and other subsystems 530, via communication network 510. Communication network 510 can be, for example, a local area network (LAN), a wide area network (WAN) such as the Internet, or a combination of the two, and can include wired, wireless, or fiber optic connections. In general, communication network 510 can be any combination of connections and protocols that will support communications between computing devices such as the server subsystem and client subsystems.

Computer 540 is shown as a block diagram with many double arrows. These double arrows (no separate reference numerals) represent a communications fabric, which provides communications between various components of computer 540. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 544 and persistent storage 547 are computer-readable storage media. In general, memory 544 can include any suitable volatile or non-volatile computer-readable storage media. It is further noted that, now and/or in the near future: (i) external device(s) 560 may be able to supply some or all memory for subsystem 530; and/or (ii) devices external to subsystem 530 may be able to provide memory for subsystem 530.

The programs 548 are stored in persistent storage 547 for access and/or execution by one or more of the respective computer processors 542, usually through one or more memories of memory 544. Persistent storage 547: (i) is at least more persistent than a signal in transit; (ii) stores the programs (including its soft logic and/or data) on a tangible medium (such as magnetic or optical domains); and (iii) may be substantially less persistent than permanent storage. Alternatively, data storage may be more persistent and/or permanent than the type of storage provided by persistent storage 547.

Programs 548 may include both machine readable and performable instructions, and/or substantive data (e.g., the type of data stored in a database). In one particular embodiment, persistent storage 547 includes a magnetic hard disk drive. To name some possible variations, persistent storage 547 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 547 may also be removable. For example, a removable hard drive may be used for persistent storage 547. Other examples include optical and magnetic disks, thumb drives, and smart cards that are inserted into a drive for transfer onto another computer-readable storage medium that is also part of persistent storage 547.

Communications unit 541 in the depicted example provides for communications with other data processing systems or devices external to subsystem 520. In these examples, communications unit 541 includes one or more network interface cards. Communications unit 541 may provide communications through the use of either, or both, physical and wireless communications links. Any software modules discussed herein may be downloaded to a persistent storage device (such as persistent storage device 560) through a communications unit (such as communications unit 541).

I/O interface set 543 allows for input and output of data with other devices that may be connected locally in data communication with computer 540. For example, I/O interface set 543 provides a connection to external device set 560. External device set 560 will typically include devices such as a keyboard, keypad, touch screen, and/or some other suitable input device. External device set 560 can also include portable computer-readable storage media such as, for example, thumb drives, portable optical or magnetic disks, and memory cards. Software and data used to practice embodiments of the present invention, for example, programs 548, can be stored on such portable computer-readable storage media. In these embodiments the relevant software may (or may not) be loaded, in whole or in part, onto persistent storage device 560 via I/O interface set 543. I/O interface set 543 also connects in data communication with display device 550. Display device 550 provides a mechanism to display data to a user and may be, for example, a computer monitor or a smart phone display screen.

Figure 5B:
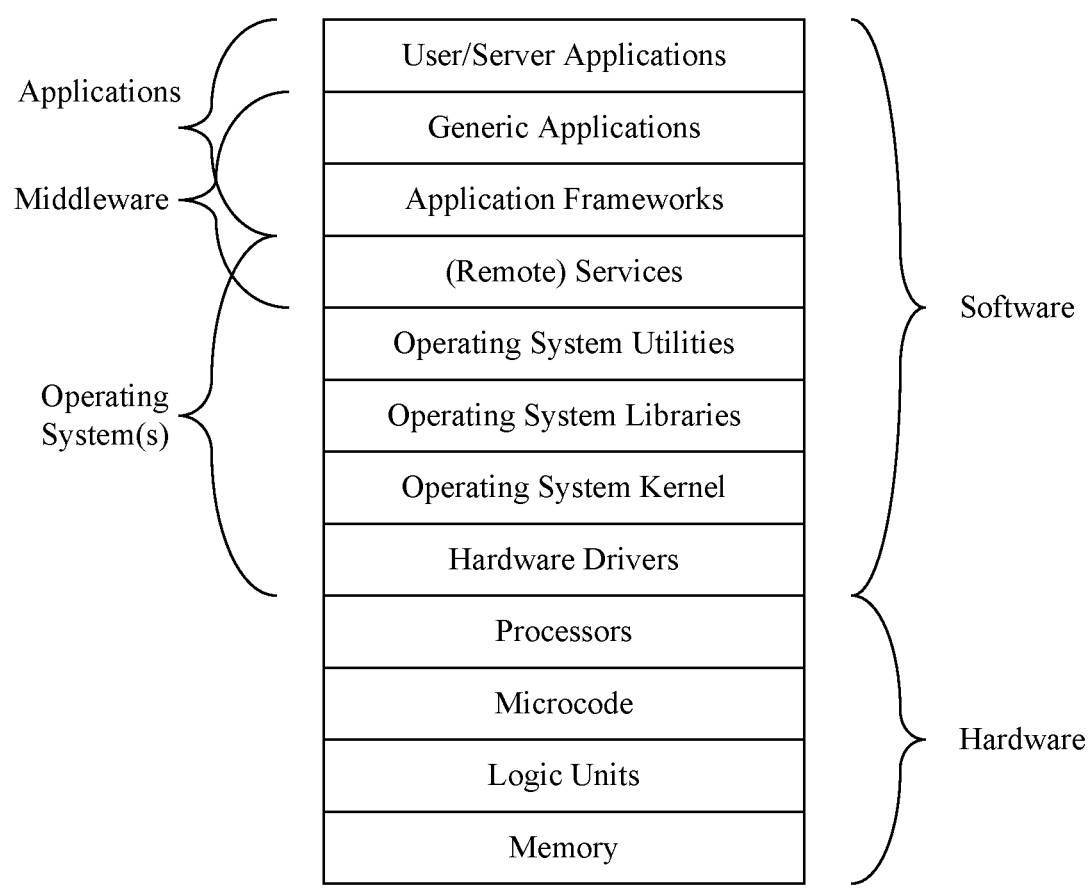
FIG. 5B is a block diagram illustrating one example of a computing stack in accordance with at least one embodiment disclosed herein.

FIG. 5B is a block diagram illustrating one example of a computing stack 570 in accordance with at least one embodiment disclosed herein. As depicted, the computing stack 570 includes a number of computing layers 572 used for conducting computing operations. In the depicted embodiment, the layers include hardware layers and software layers. The various software layers include operating system layers associated with executing one or more operating systems, middleware layers associated with executing middleware that expands and/or improves the functionality of hardware layers, and executing operating system(s). The software layers may also include various application-specific layers. The application-specific layers may include application frameworks that further expand on, and/or improve upon, the functionality of hardware layers and operating system layers.

The memory layer may include volatile memory, non-volatile memory, persistent storage and hardware associated with controlling such memory. The logic units may include CPUs, arithmetic units, graphic processing units, and hardware associated with controlling such units. The microcode layer may include executable instructions for controlling the processing flow associated with moving data between memory and the logic units. The processor layer may include instruction fetch units, instruction decode units, and the like that enable execution of processing instructions and utilization of the underlying hardware layers.

The hardware drivers (also known as the hardware abstraction layer) may include executable code that enables an operating system to access and control storage devices, DMA hardware, I/O buses, peripheral devices, and other hardware associated with a computing environment. The operating system kernel layer may receive I/O requests from higher layers and manage memory and other hardware resources via the hardware drivers. The operating system kernel layer may also provide other functions such as inter-process communication and file management.

Operating system libraries and utilities may expand the functionality provided by the operating system kernel and provide an interface for accessing those functions. Libraries are typically leveraged by higher layers of software by linking library object code into higher level software executables. In contrast, operating system utilities are typically standalone executables that can be invoked via an operating system shell that receives commands from a user and/or a script file. Examples of operating system libraries include file I/O libraries, math libraries, memory management libraries, process control libraries, data access libraries, and the like. Examples of operating system utilities include anti-virus managers, disk formatters, disk defragmenters, file compressors, data or file sorters, data archivers, memory testers, program installers, package managers, network utilities, system monitors, system profilers, and the like.

Services are often provided by a running executable or process that receives local or remote requests from other processes or devices called clients. A computer running a service is often referred to as a server. Examples of servers include database servers, file servers, mail servers, print servers, web servers, game servers, and application servers.

Application frameworks provide functionality that is commonly needed by applications and include system infrastructure frameworks, middleware integration, frameworks, enterprise application frameworks, graphical rendering frameworks, and gaming frameworks. An application framework may support application development for a specific environment or industry. In some cases, application frameworks are available for multiple operating systems and providing a common programming interface to developers across multiple platforms.

Generic applications include applications that are needed by most users. Examples of generic applications include mail applications, calendaring and scheduling applications, and web browsers. Such applications may be automatically included with an operating system.

One of skill in the art will appreciate that an improvement to any of the depicted layers, or similar layers that are not depicted herein, results in an improvement to the computer itself including the computer 540 and/or the client devices 510. One of skill in the art will also appreciate that the depicted layers are given byway of example are not representative of all computing devices. Nevertheless, the concept of improving the computer itself by improving one or more functional layers is essentially universal.

The executables and programs described herein are identified based upon the application or software layer for which they are implemented in a specific embodiment of the present invention. However, it should be appreciated that any particular program nomenclature herein is used merely for convenience, and thus the present invention should not be limited to use solely in any specific identified application or software layer.

The features, advantages, and characteristics of the embodiments described herein may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA), may execute the computer-readable program instructions by utilizing state information of the computer-readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus, or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some of the functional units described in this specification may have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

In the preceding description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The description of elements in each figure may refer to elements of proceeding figures. Like numbers refer to like elements in all figures, including alternate embodiments of like elements. The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for playing music, the method comprising:
   identifying, by a processor on-the-fly, a first plurality of unknown users that are currently located within a first selected area of an establishment and a second plurality of unknown users that are currently located within a second selected area of the establishment via locating respective electronic devices associated with each unknown user of the first and second plurality of unknown users;
   retrieving, by the processor on-the-fly, music listening data for each identified unknown user from each respective electronic device, wherein each retrieved music listening data is associated with an identified unknown user corresponding to the electronic device from which the music listening data is retrieved;
   building, by the processor on-the-fly, a first playlist for the first selected area and a second playlist for the second selected area based on the music listening data retrieved from each respective electronic device associated with each unknown user of the first and second plurality of unknown users;
   accessing host preference data for the first selected area and the second selected area, the host preference data comprising respective schedule dependent preferences and objectives for each of the first selected area and the second selected area;
   filtering, by the processor in real time on-the-fly, the first playlist according to the schedule dependent preferences and objectives for the first selected area to produce a first filtered playlist on-the-fly for the first selected area;
   filtering, by the processor on-the-fly, the second playlist according to the schedule dependent preferences and objectives for the second selected area to produce a second filtered playlist on-the fly for the second selected area; and
   playing, by the processor in real-time, the first filtered playlist within the first selected area and the second filtered playlist within the second selected area,
   wherein:
     the first selected area and the second selected area are different areas of the establishment,
     the first filtered playlist and the second filtered playlist are different filtered playlists,
     the first filtered playlist is a first temporary filtered playlist specific to the first plurality of unknown users and the schedule dependent preferences and objectives for the first selected area at a first particular time,
     the second filtered playlist is a second temporary filtered playlist specific to the second plurality of unknown users and the schedule dependent preferences and objectives for the second selected area at a second particular time, and
     the first and second filtered playlists change depending on a change to the first and second plurality of unknown users, respectively, or a change to the schedule dependent preferences and objectives for the first and second selected areas, respectively, at different times.

2. The method of claim 1, wherein each selected area is a geo-fenced area.

3. The method of claim 1, wherein each host preference data comprises preferences selected from the group consisting of a preferred genre, a preferred artist, a preferred tempo, a preferred mood and a preferred demographic.

4. The method of claim 1, wherein the music listening data comprises a music selection history for the plurality of unknown users.

5. The method of claim 1, wherein the music listening data comprises one or more preferred genres for the plurality of unknown users.

6. The method of claim 1, wherein:
the first filtered playlist includes a first commonly selected song for the first plurality of unknown users of electronic devices within the first selected area; and
the second filtered playlist includes a second commonly selected song for the second plurality of unknown users of electronic devices within the second selected area.

7. The method of claim 1, wherein:
the first filtered playlist includes one or more first songs corresponding to a first commonly preferred genre for the first plurality of unknown users of electronic devices within the first selected area; and
the second filtered playlist includes one or more second songs corresponding to a second commonly preferred genre for the second plurality of unknown users of electronic devices within the second selected area.

8. The method of claim 1, wherein identifying the first and second plurality of unknown users of electronic devices comprises identifying each electronic device that is currently within each respective of the first selected area and the second selective area.

9. The method of claim 8, further comprising requesting a user profile from each electronic device.

10. The method of claim 8, further comprising receiving the user profile from each electronic device.

11. The method of claim 10, wherein each user profile comprises user identity information.

12. The method of claim 10, wherein each user profile comprises demographic information.

13. The method of claim 10, wherein each user profile indicates a music listening service.

14. The method of claim 13, further comprising retrieving at least a portion of the music listening data from the music listening service.

15. A computer program product for playing music, the computer program product comprising a computer readable storage medium having program instructions embodied therewith, wherein the computer readable storage medium is not a transitory signal per se, the program instructions executable by a processor to cause the processor to conduct a method comprising:
identifying, by the processor on-the-fly, a first plurality of unknown users that are currently located within a first selected area of an establishment and a second plurality of unknown users that are currently located within a second selected area of the establishment via respective electronic devices associated with each unknown user of the first and second plurality of unknown users;
retrieving, on-the-fly, music listening data for each identified unknown user from each respective electronic device, wherein each retrieved music listening data is associated with an identified unknown user corresponding to the electronic device from which the music listening data is retrieved;
building, on-the-fly, a first playlist for the first selected area and a second playlist for the second selected area based on the music listening data retrieved from each respective electronic device associated with each unknown user of the first and second plurality of unknown users;
accessing host preference data for the first selected area and the second selected area, the host preference data comprising respective schedule dependent preferences and objectives for each of the first selected area and the second selected area;
filtering, on-the-fly, the first playlist according to the schedule dependent preferences and objectives for the first selected area to produce a first filtered playlist on-the-fly for the first selected area;
filtering, on-the-fly, the second playlist according to the schedule dependent preferences and objectives for the second selected area to produce a second filtered playlist on-the-fly for the second selected area; and
simultaneously playing, by the processor in real-time, the first filtered playlist within the first selected area and the second filtered playlist within the second selected area,
wherein:
the first selected area and the second selected area are different areas of the establishment, and
the first filtered playlist and the second filtered playlist are different filtered playlists,
the first filtered playlist is a first temporary filtered playlist specific to the first plurality of unknown users and the schedule dependent preferences and objectives for the first selected area at a first particular time,
the second filtered playlist is a second temporary filtered playlist specific to the second plurality of unknown users and the schedule dependent preferences and objectives for the second selected area at a second particular time, and
the first and second filtered playlists change depending on a change to the first and second plurality of unknown users, respectively, or a change to the schedule dependent preferences and objectives for the first and second selected areas, respectively, at different times.

16. A system for playing music, the system comprising:
one or more processors; and
a computer-readable storage medium including program instructions embodied therewith, wherein the computer-readable storage medium is not a transitory signal per se, the program instructions executable by the one or more processors to cause the one or more processors to conduct a method comprising:
identifying, on-the-fly, a first plurality of unknown users that are currently located within a first selected area of an establishment and a second plurality of unknown users that are currently located within a second selected area of the establishment via locating respective electronic devices associated with each unknown user of the first and second plurality of unknown users,
retrieving, on-the-fly, music listening data for each identified unknown user from each respective electronic device, wherein each retrieved music listening data is associated with an identified unknown user corresponding to the electronic device from which the music listening data is retrieved,
building, on-the-fly, a first playlist for the first selected area and a second playlist for the second selected area based on the music listening data retrieved from each respective electronic device associated with each unknown user of the first and second plurality of unknown users, accessing host preference data for the first selected area and the second selected area, the host preference data comprising respective schedule dependent preferences and objectives for each of the first selected area and the second selected area, filtering, on-the-fly, the first playlist according to the schedule dependent preferences and objective for the first selected area to produce a first filtered playlist for the first selected area, filtering, on-the-fly, the second playlist according to the schedule dependent preferences and objectives for the second selected area to produce a second filtered playlist for the second selected area; and playing, in real-time, the first filtered playlist within the first selected area of the establishment and the second filtered playlist within the second selected area of the establishment, wherein:
the first selected area and the second selected area are different areas of the establishment,
the first filtered playlist and the second filtered playlist are different filtered playlists,
the first filtered playlist is a first temporary filtered playlist specific to the first plurality of unknown users and the schedule dependent preferences and objectives for the first selected area at a first particular time,
the second filtered playlist is a second temporary filtered playlist specific to the second plurality of unknown users and the schedule dependent preferences and objectives for the second selected area at a second particular time, and
the first and second filtered playlists change depending on a change to the first and second plurality of unknown users, respectively, or a change to the schedule dependent preferences and objectives for the first and second selected areas, respectively, at different times.

17. The system of claim 16, wherein each host preference data comprises preferences selected from the group consisting of a preferred genre, a preferred artist, a preferred tempo, a preferred mood and a preferred demographic.

18. The system of claim 16, wherein the music listening data comprises a music selection history for the plurality of unknown users.

19. The system of claim 16, wherein the music listening data comprises one or more preferred genres for the plurality of unknown users.

20. The system of claim 16, wherein:
the first filtered playlist includes a first commonly selected song for the first plurality of unknown users of electronic devices within the first selected area; and
the second filtered playlist includes a second commonly selected song for the second plurality of unknown users of electronic devices within the second selected area.

* * * * *